(12) United States Patent
Xiong et al.

(10) Patent No.: US 9,131,227 B2
(45) Date of Patent: Sep. 8, 2015

(54) COMPUTING DEVICE WITH VIDEO ANALYZING FUNCTION AND VIDEO ANALYZING METHOD

(71) Applicants: Fu Tai Hua Industry (Shenzhen) Co., Ltd., Shenzhen (CN); HON HAI PRECISION INDUSTRY CO., LTD., New Taipei (TW)

(72) Inventors: Yu-Kai Xiong, Shenzhen (CN); Xin Lu, Shenzhen (CN); Shih-Fang Wong, New Taipei (TW); Dong-Sheng Lv, Shenzhen (CN); Xin-Hua Li, Shenzhen (CN); Yu-Yong Zhang, Shenzhen (CN); Jian-Jian Zhu, Shenzhen (CN)

(73) Assignees: Fu Tai Hua Industry (Shenzhen) Co., Ltd., Shenzhen (CN); HON HAI PRECISION INDUSTRY CO., LTD., New Taipei (TW)

( * ) Notice: Subject to any disclaimer, the term of this patent is extended or adjusted under 35 U.S.C. 154(b) by 0 days.

(21) Appl. No.: 14/034,471

(22) Filed: Sep. 23, 2013

(65) Prior Publication Data

US 2014/0376882 A1    Dec. 25, 2014

(30) Foreign Application Priority Data

Jun. 20, 2013    (CN) .................. 2013 1 02445950

(51) Int. Cl.
| | | |
|---|---|---|
| H04N 5/84 | (2006.01) | |
| H04N 17/04 | (2006.01) | |
| G06F 17/30 | (2006.01) | |
| G06K 9/00 | (2006.01) | |
| H04N 21/8549 | (2011.01) | |

(52) U.S. Cl.
CPC .......... *H04N 17/04* (2013.01); *G06F 17/30843* (2013.01); *G06K 9/00711* (2013.01); *H04N 21/8549* (2013.01)

(58) Field of Classification Search
CPC ............... H04N 21/8549; G06F 17/30843; G06K 9/00711
USPC ............................ 386/333, 248, 286
See application file for complete search history.

(56) References Cited

U.S. PATENT DOCUMENTS

| | | | | |
|---|---|---|---|---|
| 6,459,824 | B1 * | 10/2002 | Lee et al. ................ | 382/305 |
| 6,584,463 | B2 * | 6/2003 | Morita et al. ............ | 386/278 |
| 6,633,308 | B1 * | 10/2003 | Ono et al. ............... | 715/723 |
| 7,170,935 | B2 * | 1/2007 | Tojo ....................... | 375/240.01 |
| 2004/0012623 | A1 * | 1/2004 | Yashiro et al. ........... | 345/723 |
| 2006/0164702 | A1 * | 7/2006 | Shiiyama ................ | 358/537 |
| 2007/0172206 | A1 * | 7/2007 | Yashiro .................. | 386/95 |
| 2010/0310232 | A1 * | 12/2010 | Iwase et al. ............. | 386/241 |

\* cited by examiner

*Primary Examiner* — Helen Shibru
(74) *Attorney, Agent, or Firm* — Novak Druce Connolly Bove + Quigg LLP

(57) ABSTRACT

A computer-implemented video analyzing method includes dividing a video into a plurality of sections. The similarity value of the first frame and the last frame of each section is greater than zero. A representative frame is selected from each section, and the similarity value of each two representative frames is computed. Two sections the similarity of whose representative frames is the greatest are combined into one section. The recording time of the first frame and the recording time of the last frame of each section is determined if the similarity value of representative frames of each two adjacent sections is zero.

15 Claims, 3 Drawing Sheets

COMPUTING DEVICE WITH VIDEO ANALYZING FUNCTION AND VIDEO ANALYZING METHOD

BACKGROUND

1. Technical Field

The present disclosure relates to computing devices, and particularly to a computing device having a video analyzing function and a video analyzing method.

2. Description of Related Art

The speed of an electronic device (e.g. tablet computer) switching one image from another image needs to be determined during production. That is, the response time of the electronic device needs to be determined. A known method for determining the response time of the electronic device includes automatically playing a number of images which are very different from each other. The process of playing the number of images is recorded as a video. The video is then analyzed by applying a known video analyzing method to determine the response time of the electronic device. The known video analyzing method is comparing each two adjacent frames of the video to determine a number of key frames in the video, determining the recording time of each key frame, and then determining the response time of the electronic device according to the recording time of each key frame. By doing so, each frame is compared with its adjacent frame, which is time consuming.

BRIEF DESCRIPTION OF THE DRAWINGS

Many aspects of the present disclosure should be better understood with reference to the following drawings. The units in the drawings are not necessarily drawn to scale, the emphasis instead being placed upon clearly illustrating the principles of the present disclosure. Moreover, in the drawings, like reference numerals designate corresponding portions throughout the several views.

DETAILED DESCRIPTION

Embodiments of the present disclosure are described in detail, with reference to the accompanying drawings.

Figure 1:
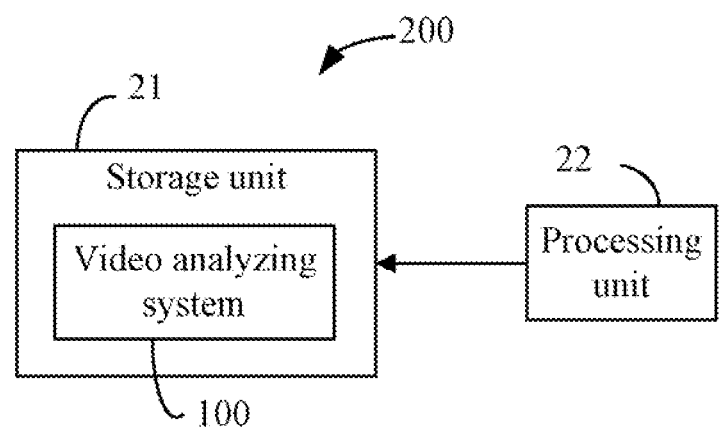
FIG. 1 is a block diagram of a computing device with a video analyzing function, in accordance with an exemplary embodiment.

FIG. 1 shows an embodiment of a computing device 200 with a video analyzing function. The computing device 200 may be a smart phone or a tablet computer. The computing device 200 includes a storage unit 21 and a processing unit 22. The storage unit 21 stores a video and a number of modules of a video analyzing system 100. In this embodiment, the video records a process of the computing device 200 automatically playing a number of images which are very different from each other. The computing device 200 analyzes the stored video to find key frames of the video, and determines a speed of switching one image from another image according to the recording time of each key frame of the video.

Figure 2:
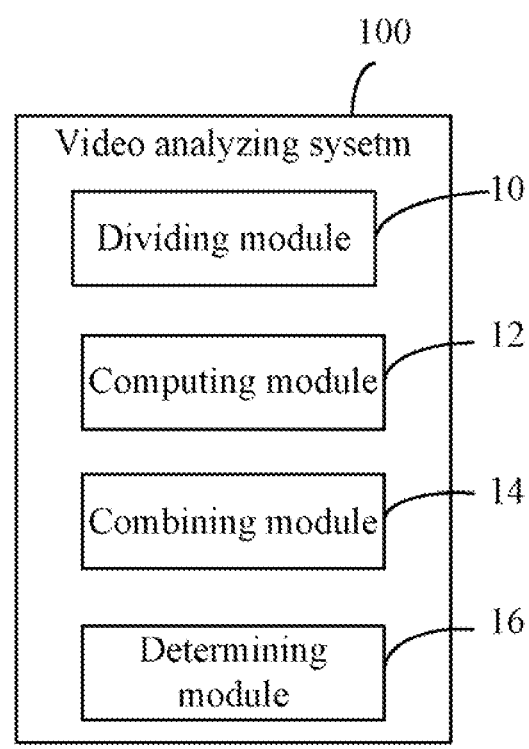
FIG. 2 is a block diagram of a video analyzing system of the computing device of FIG. 1.

FIG. 2 shows that the processing unit 22 analyzes the video by executing the number of modules of the video analyzing system 100. In this embodiment, the video analyzing system 100 includes a dividing module 10, a computing module 12, a combining module 14, and a determining module 16 which are collection of software instructions.

Figure 3:
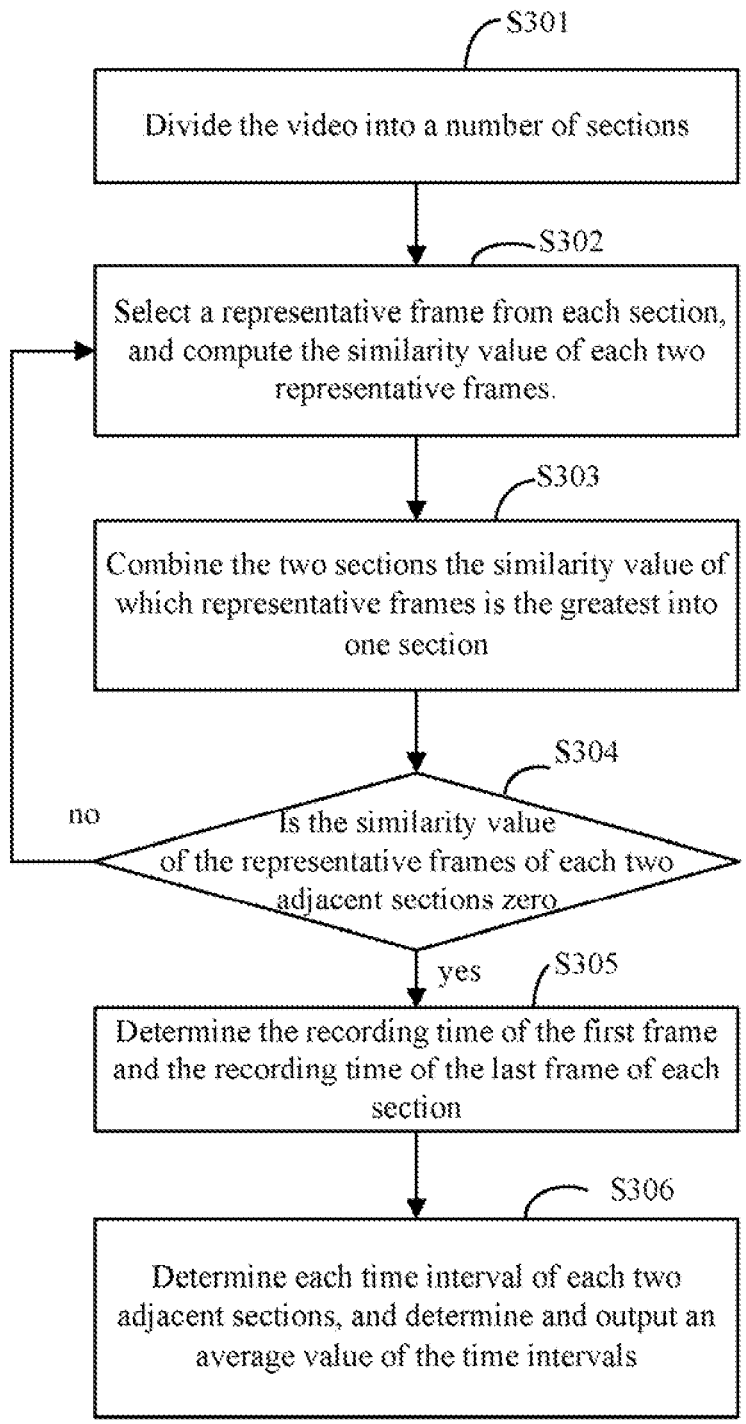
FIG. 3 is a flowchart of a video analyzing method, in accordance with an exemplary embodiment.

FIG. 3 is a flowchart of a video analyzing method, in accordance with an exemplary embodiment.

In step S301, the dividing module 10 divides the video into a number of sections. The similarity value of the first frame and the last frame of each section is greater than zero. Thus, the similarity value of any two frames of each section is greater than zero. In this embodiment, if a difference value between pixel values of two pixels of two frames is less than a preset value when the two pixels are in a same position of a same coordinate system, the two pixels are defined as the same pixels. The quantity of the same pixels of two frames is defined as the similarity value of the two frames. In this embodiment, if the time length of the video is T, the dividing module 10 firstly divides the video into two sections according to a time interval t1. The time length of the first section is t1, and the time length of the second section is T−t1. If the similarity value of the first frame and the last frame of the first section is greater than zero, the dividing module 10 continuously divides the second section into two sections according to the time interval t1. If the similarity value of the first frame and the last frame of the first section is zero, the dividing module 10 selects another time interval t2 which is less than the time interval t1, and again divides the video into two sections according to the time interval t2. By doing so, the video is divided into a number of sections, and the similarity value of the first frame and the last frame of each section is greater than zero. In this embodiment, if the similarity value of the first frame and the last frame of each section is greater than zero, it can be concluded that each section records the playing process of a same image.

In step S302, the computing module 12 selects a representative frame, such as a middle frame for example, from each section, and computes the similarity value of each two representative frames.

In step S303, the combining module 14 combines the two sections that the similarity value is the greatest into one section. In this embodiment, the combining module 14 defines a matrix consisting of the reciprocal of each similarity value of each two representative frames, where each value in a diagonal of the matrix is a reciprocal of the quantity of the pixels of each representative frame, and each value in each row of the matrix is the reciprocal of the similarity value of the representative frame of one section and the representative frame of each of the other sections. The combining module 30 determines a least value of the matrix except the values in the diagonal of the matrix, and determines that the similarity value which reciprocal is the least value is the greatest similarity value. The combining module 30 further combines the two sections that the similarity value is the greatest similarity value into one section. In this embodiment, if the similarity value of two representative frames of two sections is greater, it indicates that the two sections are similar, and can be combined into one section.

In step S304, the computing module 12 determines whether the similarity value of the representative frames of each two adjacent sections is zero. If yes, the procedure goes to step S305. Otherwise, the procedure returns to step S302. In this embodiment, if the similarity value of the representative frames of each two adjacent sections is zero, it indicates that each section records the whole playing process of a same image.

In step S305, the determining module 16 determines the recording time of the first frame and the recording time of the last frame of each section. In this embodiment, if each section records the whole playing process of a same image, the first frame and the last frame of each section are key frames of each section.

In step S306, the determining module 16 determines each time interval of each two adjacent sections according to the recording time of the last frame of the former section and the recording time of the first frame of the latter section, and determines and outputs an average value of the time intervals. In this embodiment, the average value is the speed that the electronic device 200 switches from one image to another image.

In this embodiment, the video is divided into several sections. Each section records the whole playing process of a same image, thus the electronic device 200 can determine that the first frame and the last frame of each section is key frames of each section, and can quickly determine the speed that the electronic device 200 switches from one image to another image.

Although the present disclosure has been specifically described on the basis of the exemplary embodiment thereof, the disclosure is not to be construed as being limited thereto. Various changes or modifications may be made to the embodiment without departing from the scope and spirit of the disclosure.

What is claimed is:

1. A computing device comprising:
   a storage unit storing a video and a plurality of modules of a video analyzing system; and
   a processing unit to execute the plurality of modules of the video analyzing system to perform operations of analyzing the video, the operations comprising:
   dividing the video into a plurality of sections, wherein a similarity value of the first frame and the last frame of each section is greater than zero;
   selecting a representative frame from each section, and computing a similarity value of each two representative frames of the plurality of sections;
   combining two sections the similarity value of whose representative frames is the greatest into one section;
   determining whether the similarity value of representative frames of each two adjacent sections is zero after combining two sections the similarity value of whose representative frames is the greatest each time;
   continuing to select a representative frame from each section and combine two sections the similarity value of whose representative frames is the greatest into one section until the similarity value of representative frames of each two adjacent sections is zero; and
   determining recording time of the first frame and recording time of the last frame of each section if the similarity value of representative frames of each two adjacent sections is zero.

2. The computing device as described in claim 1, wherein if a difference value between pixel values of two pixels of two frames is less than a preset value when the two pixels are in a same position of a same coordinate system, the two pixels are defined as the same pixels, and the quantity of the same pixels of two frames is defined as the similarity value of the two frames.

3. The computing device as described in claim 1, wherein the middle frame of each section is selected as the representative frame.

4. The computing device as described in claim 1, wherein a matrix consisting of the reciprocal of each similarity value of each two representative frames is defined, each value in a diagonal of the matrix is a reciprocal of the quantity of the pixels of each representative frame, and each value in each row of the matrix is the reciprocal of the similarity value of the representative frame of one section and the representative frame of each of the other sections, the least value of the matrix except the values in the diagonal of the matrix is determined, and the two sections the reciprocal of the similarity value of whose representative frames is the least value is combined into one section.

5. The computing device as described in claim 1, wherein the operations further comprising: determining each time interval of each two adjacent sections according to the recording time of the last frame of the former section and the recording time of the first frame of the latter section if the similarity value of the representative frames of each two adjacent sections is zero, and determining an average value of the time intervals.

6. A computer-implemented video analyzing method comprising:
   dividing a video into a plurality of sections, wherein a similarity value of the first frame and the last frame of each section is greater than zero;
   selecting a representative frame from each section, and computing a similarity value of each two representative frames of the plurality of sections;
   combining two sections the similarity value of whose representative frames is the greatest into one section;
   determining whether the similarity value of representative frames of each two adjacent sections is zero after combining two sections the similarity value of whose representative frame is the greatest each time;
   continuing to select a representative frame from each section and combine two sections the similarity value of whose representative frames is the greatest into one section until the similarity value of representative frames of each two adjacent sections is zero; and
   determining recording time of the first frame and recording time of the last frame of each section if the similarity value of represetative frames of each two adjacent sections is zero.

7. The method as described in claim 6, wherein if a difference value between pixel values of two pixels of two frames is less than a preset value when the two pixels are in a same position of a same coordinate system, the two pixels are defined as the same pixels, and the quantity of the same pixels of two frames is defined as the similarity value of the two frames.

8. The method as described in claim 7, wherein the middle frame of each section is selected as the representative frame.

9. The method as described in claim 7, wherein a matrix consisting of the reciprocal of each similarity value of each two representative frames is defined, each value in a diagonal of the matrix is a reciprocal of the quantity of the pixels of each representative frame, and each value in each row of the matrix is the reciprocal of the similarity value of the representative frame of one section and the representative frame of each of the other sections, the least value of the matrix except the values in the diagonal of the matrix is determined, and the two sections the reciprocal of the similarity value of whose representative frames is the least value is combined into one section.

10. The method as described in claim 7, wherein the operations further comprising: determining each time interval of each two adjacent sections according to the recording time of the last frame of the former section and the recording time of the first frame of the latter section if the similarity value of the representative frames of each two adjacent sections is zero, and determining an average value of the time intervals.

11. A non-transitory computer-readable storage medium encoded with a computer program, the program comprising instructions that when executed by a computing device to cause the computing device to perform operations for analyzing a video, the operations comprising:

dividing a video into a plurality of sections, wherein a similarity value of the first frame and the last frame of each section is greater than zero;

selecting a representative frame from each section, and computing a similarity value of each two representative frames of the plurality of sections;

combining two sections the similarity of whose representative frames is the greatest into one section;

determining whether the similarity value of representative frames of each two adjacent sections is zero after combining two sections the similarity value of whose representative frames is the greatest each zero;

continuing to select a representative frame from each section and combine two sections the similarity value of whose representative frames is the greatest into one section until the similarity value of representative frames of each two adjacent sections is zero; and determining recording time of the first frame and recording time of the last frame of each section if the similarity value of representative frames of each two adjacent sections is zero.

12. The storage medium as described in claim 11, wherein if a difference value between pixel values of two pixels of two frames is less than a preset value when the two pixels are in a same position of a same coordinate system, the two pixels are defined as the same pixels, and the quantity of the same pixels of two frames is defined as the similarity value of the two frames.

13. The storage medium as described in claim 11, wherein the middle frame of each section is selected as the representative frame.

14. The storage medium as described in claim 11, wherein a matrix consisting of the reciprocal of each similarity value of each two representative frames is defined, each value in a diagonal of the matrix is a reciprocal of the quantity of the pixels of each representative frame, and each value in each row of the matrix is the reciprocal of the similarity value of the representative frame of one section and the representative frame of each of the other sections, the least value of the matrix except the values in the diagonal of the matrix is determined, and the two sections the reciprocal of the similarity value of whose representative frames is the least value is combined into one section.

15. The storage medium as described in claim 11, wherein the operations further comprising: determining each time interval of each two adjacent sections according to the recording time of the last frame of the former section and the recording time of the first frame of the latter section if the similarity value of representative frames of each two adjacent sections is zero, and determining an average value of the time intervals.

* * * * *